Aug. 29, 1967  A. W. GORDON  3,338,390
THERMOMETER CASE
Filed May 12, 1966

INVENTOR.
ARNOLD W. GORDON
BY Peter L. Costas

ATTORNEY

United States Patent Office 3,338,390
Patented Aug. 29, 1967

3,338,390
THERMOMETER CASE
Arnold W. Gordon, Woodbridge, Conn., assignor to Stelray Products, Inc., Shelton, Conn., a corporation of Connecticut
Filed May 12, 1966, Ser. No. 549,655
3 Claims. (Cl. 206—16.5)

The present invention relates to a thermometer case for protecting a thermometer from damage due to impacts occurring during normal storage and transport as well as accidental impacts of greater magnitude.

It is an object of the present invention to provide a novel thermometer case which is particularly advantageous in protecting a thermometer received therein from injury due to impacts thereon and which may be easily loaded and unloaded.

It is also an object to provide such a thermometer case that has resilient portions adapted to position and resiliently support thermometers of varying dimensions and configurations.

Another object is to provide such a thermometer case that is relatively inexpensive and simple to manufacture and which is rugged in construction.

Other objects and advantages will be readily apparent from the following detailed description and the attached drawings wherein.

Figure 1:
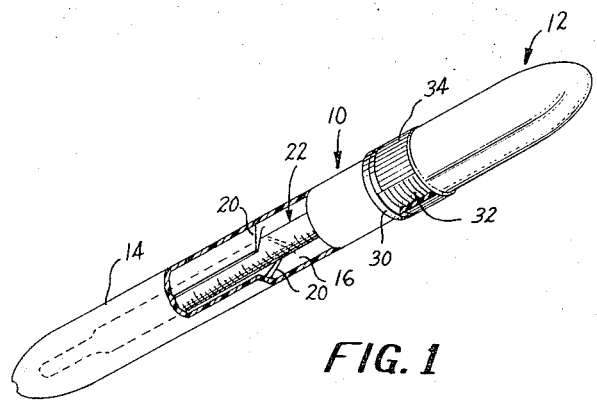
FIGURE 1 is a perspective view of a thermometer and case assembly having a portion of the casing broken away to illustrate interior construction.

It has now been found that the foregoing objects and other advantages can be readily attained in a thermometer case having an elongated body member having a barrel portion of generally circular cross section providing a cavity open at one end for receiving a thermometer. A plurality of resilient longitudinally extending fins project secantally inwardly of the cavity from the inside wall of the barrel portion to engage and position the thermometer therebetween and thereby resiliently support the thermometer within the barrel portion for protection from impact shocks. A cap is releasably engaged with the body member for closing the open end of the cavity therein and thereby a thermometer received therewithin.

In the preferred aspect, the resilient fins taper to a reduced thickness at their free ends so that the fins are relatively more flexible adjacent their free ends. In this manner, the flexibility of the free end portions of the fins is enhanced to increase the tendency thereof to wrap partially around the thermometer in order to more effectively position the thermometer and absorb shocks. For most effective operation, three fins are provided and positioned so that their roots are equally spaced about the barrel portion and project toward the roots of the adjacent fins so that lines drawn therethrough would form a substantially equilateral triangle. In this manner, the deflectable fins may automatically position thermometers of varying size and configuration centrally within the body member for effective absorption of impact shock.

The thermometer case is readily injection molded from such material as cellulose acetate, cellulose butyrate, or other synthetic plastic materials which provide the desired resilience and impact strength. If so desired, synthetic rubbers or rubber-containing polymers such as impact styrene and acrylonitrile-styrene-butadiene polymers may be employed.

Although the cap may frictionally fit upon the open end of the body member, desirably the ends thereof are threaded so as to permit threaded engagement. Generally, the body member will receive more than about 65 percent of the length of the thermometer so that the fins therein are sufficient to provide stability and shock absorption therefor. However, it may be desirable to provide similar fins in the cap for even greater shock protection.

Referring now to the attached drawing, a thermometer case embodying the present invention has a body member generally designated by the numeral 10 and a cap generally designated by the numeral 12 which is threadably received on one end of the body member 10. The body member 10 has a barrel portion 14 of generally circular cross section providing a cavity 16 which is open at the end adjacent the cap 12 and is dome shaped at its opposite end so as to provide a substantial closure. However, an air vent 18 extends through the closed end of the barrel portion 14 to release air from the cavity 16 when the cap 12 is threaded onto the body member 10.

The body member 10 has three longitudinally extending fins 20 which project secantally inwardly from the inner surface of the barrel portion 14 into the cavity 16 from roots which are equidistantly spaced about the barrel portion 14. As can be seen, the fins 20 taper to substantially a point at their free end so as to enhance their flexibility at their free end portions. In the undeflected position, the fins 20 each project toward the root of an adjacent fin so that lines drawn therethrough would form a substantially equilateral triangle.

Figure 2:
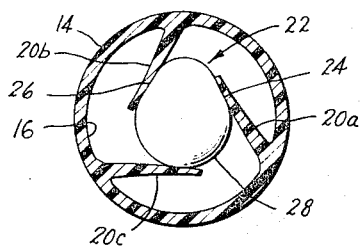
FIGURE 2 is a cross sectional view to an enlarged scale of the thermometer and case of FIGURE 1.

Resiliently but securely engaged between the fins 20 is a thermometer generally designated by the numeral 22 which is somewhat egg-shaped in cross section and has two longitudinal, generally flat side portions 24 and 26 and a generally rounded back portion 28. The first two fins 20a, b are engaged with the generally flat side portions 24 and 26 and the third fin 20c is engaged with the generally rounded back portion 28. The fins 20 are sufficiently resilient so that, as illustrated in FIGURE 2, the fins 20a, b tend to wrap around the front curved portion of the thermometer 22 adjacent the flat portion 24 and 26 and the third fins 20c wraps around the rounded back portion 28.

Adjacent the open end portion of the cavity 16, the body member has a circumferential collar 30 and a threaded portion 32. The cap 12 is internally threaded at its open end to threadably engage on the threaded portion 32, and excessive movement of the cap 12 onto the threaded portion is substantially prevented by abutment thereof against the collar 30. To facilitate turning the cap 12, a knurled portion 34 is provided on the outer surface thereof for finger gripping.

Since the fins 20 taper from a relatively thick cross section at their root where they are mounted on the barrel portion 14 to a relatively thin cross section in the area where the fins 20 contact the thermometer 22, the fins 20 are substantially more flexible at their outer extremities so that they tend to wrap around the thermometer 22 in order to more effectively position the thermometer 22 within the barrel portion 14 to absorb impact shocks as well as to accommodate thermometers of varying dimension and configuration. The tapered fins 20 also have a relatively long life because the more flexible end portions are less liable to break due to rough insertion of the thermometer 22 into the cavity 16.

Figure 3:
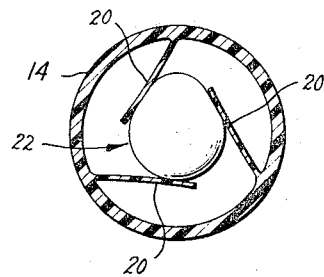
FIGURE 3 is a cross sectional view similar to FIGURE 2 of another case embodying this invention.

In the embodiment of FIGURE 3, the fins 20 are of relatively thin, generally rectangular cross section, i.e., of the same small thickness from their root to their free end. This embodiment is relatively inexpensive to manufacture and also provides resilient fins for effectively retaining thermometers of varying dimension and configuration.

In both embodiments, the insertion of the thermometer 22 into the cavity 16 may be readily effected. As the thermometer 22 tip passes into the space between the fins 20, it deflects the fins 20 and differential resistance to deflection due to misalignment tends to produce proper alignment of the thermometer 22 therebetween. Because the fins 20 extend along the surfaces of the thermometer 22, the possibility of excessive stress upon the thermometer 22 is substantially eliminated and it is securely but resiliently gripped therebetween to provide excellent cushioning therefor against impacts during use.

Thus, it can be seen that the thermometer case of the present invention is particularly effective in protecting a thermometer from injury due to impacts and the secantally positioned fins automatically locate thermometers of varying size and configuration in the proper position. The case may be readily manufactured at relatively low cost and is adapted to extended usage.

Having thus described the invention, I claim:

1. A thermometer case for supporting and enclosing a thermometer comprising: an elongated body member having a barrel portion of generally circular cross section providing a cavity open at one end for receiving an associated thermometer, said body member having three resilient, axially elongated and longitudinally extending fins extending through the midpoint of the axial length of said barrel portion and projecting secantally inwardly from said barrel portion into said cavity to engage and position the thermometer therebetween and thereby resiliently support the thermometer within said barrel portion for protection from impact shocks, said fins being dimensiond and positioned to wrap partially around the thermometer, said fins being integrally formed with said body member and tapering to a reduced thickness at their free ends so that said resilient fins are more flexible adjacent their free ends; and a cap releasably engaged with said body member for closing the open end of said cavity.

2. The thermometer case of claim 1 wherein said three fins are provided and positioned so that their roots are equally spaced about said barrel portion to define substantially an equilateral triangle.

3. The thermometer case of claim 1 wherein said body member and cap are made of synthetic plastic material and wherein the releasably engaged ends thereof are threadably engaged.

References Cited
UNITED STATES PATENTS

| | | | |
|---|---|---|---|
| 440,633 | 11/1890 | Haussmann | 206—16.5 |
| 538,077 | 4/1895 | Johnson | 206—16.6 |
| 824,038 | 6/1906 | Myers | 206—16.6 |
| 1,099,629 | 6/1914 | Young | 206—16.6 |
| 1,919,811 | 7/1933 | Stonebraker | 207—16.5 |

FOREIGN PATENTS

| | | |
|---|---|---|
| 14,406 | 1885 | Great Britain. |

LOUIS G. MANCENE, *Primary Examiner.*